(12) United States Patent
Rechenbach et al.

(10) Patent No.: US 12,240,306 B2
(45) Date of Patent: Mar. 4, 2025

(54) POWERTRAIN FOR A WORK MACHINE, AND WORK MACHINE

(71) Applicant: ZF Friedrichshafen AG, Friedrichshafen (DE)

(72) Inventors: Philipp Rechenbach, Markdorf (DE); Marton Kurucz, Friedrichshafen (DE); Raphael Himmelsbach, Friedrichshafen (DE); Benedikt Reick, Österreich (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 409 days.

(21) Appl. No.: 17/617,983

(22) PCT Filed: Jul. 7, 2020

(86) PCT No.: PCT/EP2020/069132
§ 371 (c)(1),
(2) Date: Dec. 10, 2021

(87) PCT Pub. No.: WO2021/005063
PCT Pub. Date: Jan. 14, 2021

(65) Prior Publication Data
US 2022/0258582 A1    Aug. 18, 2022

(30) Foreign Application Priority Data
Jul. 8, 2019 (DE) .................. 10 2019 209 986.6

(51) Int. Cl.
*B60K 1/02*     (2006.01)
*B60K 17/28*    (2006.01)
*F16H 3/72*     (2006.01)

(52) U.S. Cl.
CPC .............. *B60K 1/02* (2013.01); *B60K 17/28* (2013.01); *F16H 3/728* (2013.01);
(Continued)

(58) Field of Classification Search
CPC ...... B60K 1/02; B60K 17/28; B60Y 2200/22; B60Y 2200/221; B60Y 2200/91;
(Continued)

(56) References Cited

U.S. PATENT DOCUMENTS 7,641,008 B2 * 1/2010 Brenninger ............ B60K 17/28
                                                       180/53.6
8,444,516 B2 * 5/2013 Tamai ................... B60K 6/445
                                                         475/5
(Continued)

FOREIGN PATENT DOCUMENTS

CN         104633020 A      5/2015
DE     20 2014 000 738 U1   4/2014
(Continued)

OTHER PUBLICATIONS

European Patent Office, Written Opinion Of the International Search Authority, PCT Application No. PCT/EP2020/069132 (Mailed Oct. 2, 2020).
(Continued)

*Primary Examiner* — Babar Sarwar
(74) *Attorney, Agent, or Firm* — Finch & Maloney PLLC

(57) ABSTRACT

The present disclosure relates to a powertrain for a work machine, such as an agricultural work machine. The powertrain includes a first electric motor with a first drive shaft that can be driven by the first electric motor, and a second electric motor with a second drive shaft that can be driven by the second electric motor. The powertrain has a first coupling gearwheel arranged on the first drive shaft and a second coupling gearwheel arranged on the second drive shaft, where the first coupling gearwheel engages with the second coupling gearwheel. Also disclosed is a corresponding work machine incorporating the powertrain.

19 Claims, 2 Drawing Sheets

(52) U.S. Cl.
CPC ....... *B60Y 2200/22* (2013.01); *B60Y 2200/91* (2013.01); *B60Y 2300/1888* (2013.01); *B60Y 2400/73* (2013.01)

(58) Field of Classification Search
CPC ...... B60Y 2300/1888; B60Y 2400/424; B60Y 2400/73; F16H 3/728
See application file for complete search history.

(56) References Cited

U.S. PATENT DOCUMENTS

| | | | | |
|---|---|---|---|---|
| 8,608,615 | B2 * | 12/2013 | Fuechtner | F16H 3/10 |
| | | | | 74/330 |
| 9,221,337 | B2 * | 12/2015 | Slapak | B60K 17/28 |
| 9,297,441 | B2 * | 3/2016 | Wechs | B60K 6/48 |
| 9,541,121 | B2 * | 1/2017 | Knoblauch | B60K 1/00 |
| 9,568,082 | B2 * | 2/2017 | Yang | B60K 6/52 |
| 9,604,669 | B2 * | 3/2017 | Sonnenburg | B60K 1/02 |
| 9,770,969 | B2 * | 9/2017 | Björkman | B60K 6/445 |
| 9,789,754 | B2 * | 10/2017 | Zhu | B60W 20/00 |
| 9,840,140 | B1 * | 12/2017 | Holmes | F16H 3/728 |
| 10,100,910 | B2 * | 10/2018 | Nakayama | F16H 48/10 |
| 10,106,024 | B2 * | 10/2018 | Wilton | B60K 6/547 |
| 10,328,929 | B2 * | 6/2019 | Yagasaki | B60K 6/26 |
| 10,384,526 | B2 * | 8/2019 | Rothe | B60K 6/40 |
| 10,814,714 | B2 * | 10/2020 | Hummel | B60K 6/547 |
| 10,840,779 | B2 * | 11/2020 | Reuter | H02K 7/003 |
| 10,968,982 | B2 * | 4/2021 | Barendrecht | B60K 17/043 |
| 11,001,252 | B2 * | 5/2021 | Nakagawara | B60K 6/387 |
| 11,046,167 | B2 * | 6/2021 | Hao | B60K 6/36 |
| 11,052,746 | B2 * | 7/2021 | Yu | B60B 35/14 |
| 11,067,152 | B2 * | 7/2021 | Biermann | F16H 3/66 |
| 11,254,205 | B2 * | 2/2022 | Cook | B60K 17/12 |
| 11,292,331 | B2 * | 4/2022 | MacMillian | F16D 21/02 |
| 11,305,581 | B2 * | 4/2022 | Ling | B60B 35/14 |
| 11,618,312 | B2 * | 4/2023 | Verbridge | B60K 17/356 |
| | | | | 180/242 |
| 11,674,566 | B2 * | 6/2023 | Brammer | F16H 37/0806 |
| | | | | 475/204 |
| 2011/0042155 | A1 | 2/2011 | Tarasinski et al. | |
| 2012/0006153 | A1 * | 1/2012 | Imamura | B60K 6/547 |
| | | | | 74/665 A |
| 2014/0277884 | A1 | 9/2014 | Zhou et al. | |
| 2016/0137045 | A1 * | 5/2016 | Zhu | B60W 20/00 |
| | | | | 180/65.265 |
| 2017/0008510 | A1 * | 1/2017 | Imamura | B60K 6/445 |
| 2017/0217300 | A1 * | 8/2017 | Rothe | B60K 6/387 |
| 2019/0331200 | A1 * | 10/2019 | Barendrecht | B60K 17/046 |
| 2019/0358999 | A1 * | 11/2019 | Ling | F16H 1/28 |
| 2019/0389299 | A1 * | 12/2019 | Yu | B60K 6/36 |

FOREIGN PATENT DOCUMENTS

| | | | | |
|---|---|---|---|---|
| EP | | 3098106 A1 | 11/2016 | |
| WO | | 2009/083750 A1 | 7/2009 | |
| WO | WO-2018137423 A1 * | | 8/2018 | ............ B60B 35/14 |
| WO | | 2020/074340 A1 | 4/2020 | |

OTHER PUBLICATIONS

European Patent Office, International Search Report, PCT Application No. PCT/EP2020/069132 (Mailed Oct. 2, 2020).

German Patent Office, Office Action, German Application No. 10 2019 209 986.6 (Mailed Sep. 1, 2020).

* cited by examiner

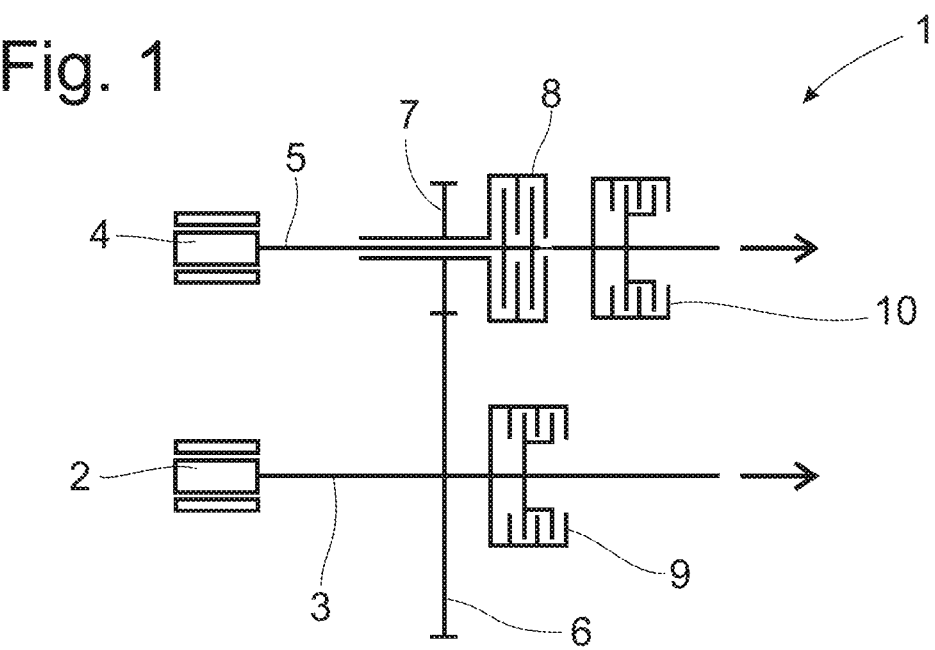
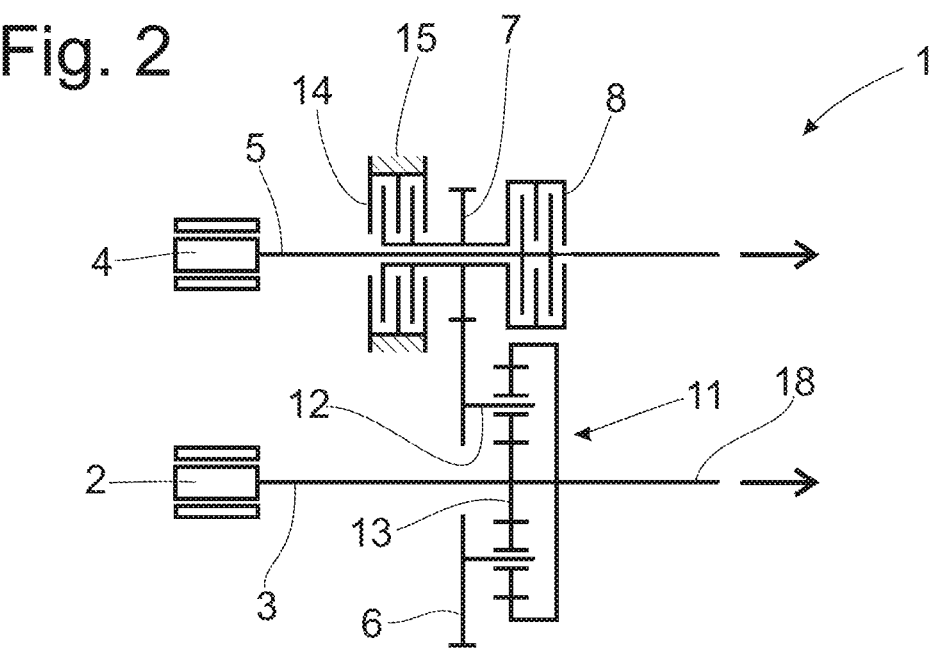

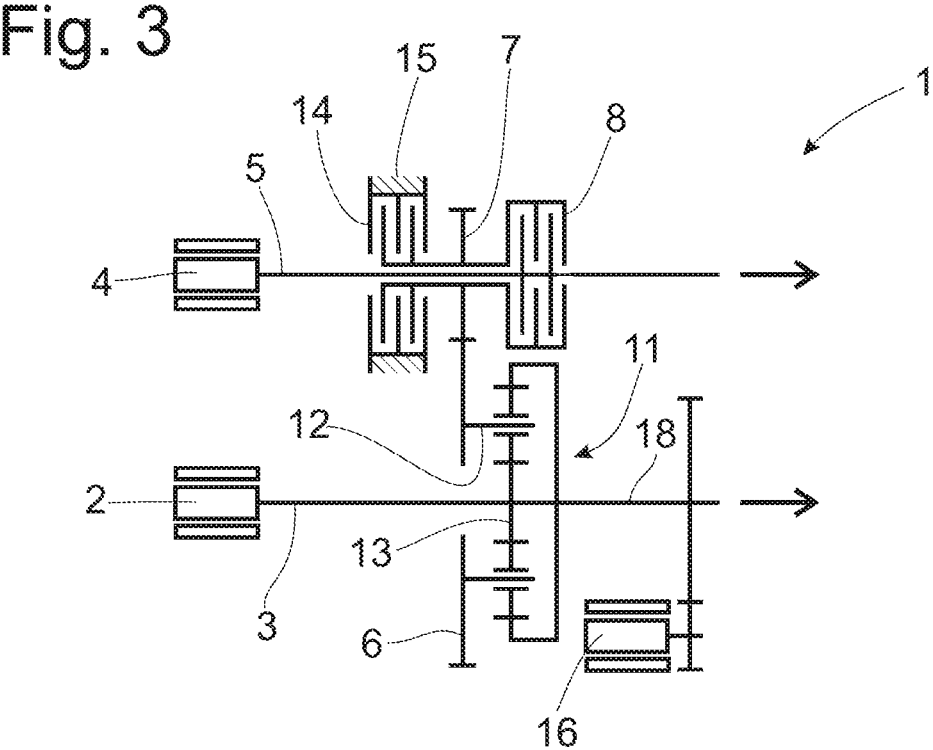
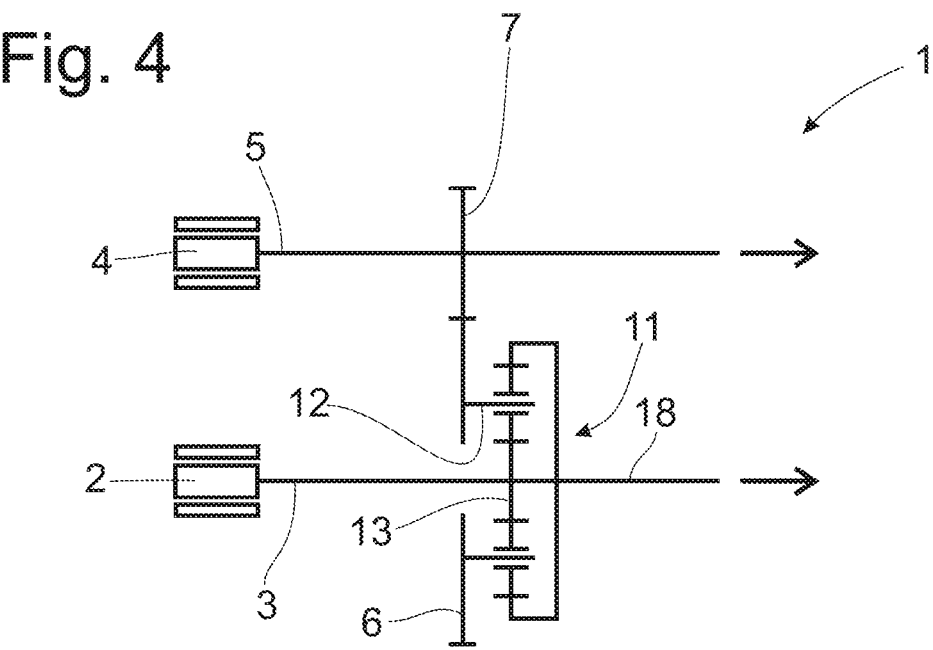

POWERTRAIN FOR A WORK MACHINE, AND WORK MACHINE

This application claims the benefit under 35 U.S.C. § 371 as a U.S. National Phase Application of International Application No. PCT/EP2020/069132 filed on Jul. 7, 2020, which claims priority from German Application No. 10 2019 209 986.6, filed on Jul. 8, 2019, the contents of which are incorporated herein in their entireties.

FIELD OF THE INVENTION

The present invention relates to a powertrain for a work machine as variously disclosed herein, and to a corresponding work machine including the powertrain.

BACKGROUND

Electrically driven work machines, such as wheeled loaders, dumpers or agricultural tractors, are known in the prior art. Such work machines are on the one hand purely electrically driven, that is to say, for their energy supply, they have only an electrical battery or an electrical accumulator, which provides the electrical energy required by one or more electric motors. On the other hand, they are driven by diesel-electric means, which means that the required electrical energy is provided by a diesel-driven generator and, if necessary, by an electrical buffer store, for example a correspondingly dimensioned capacitor or a rechargeable battery. In both cases, the mechanical power required for the traction drive and the work drive is provided by one or more electric motors.

In this context, a purely electrically driven agricultural work machine is known to the applicant under the designation "Fendt e100", which is driven by an individual central drive configured as an electric motor. The drive power of the central drive can be transmitted to the individual wheels as required via a power-split transmission.

Furthermore, an agricultural work machine with diesel-electric drive is known to the applicant under the name "Rigitrac EWD120", which comprises a diesel-driven generator for providing electrical power and also four electric individual wheel drives which are integrated into the wheel rims and configured as wheel hub drives. The electrical power generated by the generator is provided to the wheel hub drives. Individual open-loop and closed-loop control of the drive wheels is made possible by means of the individual wheel drives. Furthermore, the "Rigitrac EWD120" has an electrical braking resistor which, when the electric motors are in generator mode, constitutes an electrical load that loads and brakes the electric motors.

DE 20 2014 000 738 U1 describes a purely electromotively driven wheeled loader, which has a first electric motor for a traction drive and a second electric motor for a work drive.

The known electrically driven work machines have not yet fully exploited the advantages that are possible with an electric drive concept.

SUMMARY

It is an object of the invention to propose an improved powertrain for a work machine.

Said object is achieved according to the invention by the drive assembly for a work machine as variously disclosed herein. Numerous embodiments and refinements will be apparent in light of the present disclosure.

The invention relates to a powertrain for a work machine, wherein the powertrain comprises a first electric motor, with a first drive shaft that can be driven by the first electric motor, and a second electric motor, with a second drive shaft that can be driven by the second electric motor. The powertrain according to the invention is distinguished by the fact that a first coupling gearwheel is arranged on the first drive shaft and a second coupling gearwheel is arranged on the second drive shaft, wherein the first coupling gearwheel engages with the second coupling gearwheel.

According to the invention, a powertrain with two electric motors that can be operated independently of one another, namely with the first electric motor and the second electric motor, is thus provided. Here, a first drive shaft is assigned to the first electric motor and can be driven by the first electric motor, and a second drive shaft is assigned to the second electric motor and can be driven by the second electric motor. The first and the second drive shaft may either be formed integrally with the respective motor shaft of the first and of the second electric motor respectively, that is to say may be identical to the respective motor shaft, or else may be independent components that are merely connected in terms of drive to the first electric motor and to the second electric motor respectively, for example via a step-up or step-down transmission ratio stage. In each case one coupling gearwheel is provided both on the first drive shaft and on the second drive shaft, namely the first coupling gearwheel and the second coupling gearwheel respectively, wherein the first coupling gearwheel engages with the second coupling gearwheel. The first coupling gearwheel and the second coupling gearwheel are advantageously spur gearwheels. The first coupling gearwheel and the second coupling gearwheel may optionally be of identical configuration, that is to say leave a transmitted rotational speed unchanged, or else may be configured as a step-up or step-down transmission ratio stage and correspondingly increase or decrease a transmitted rotational speed.

This results in the advantage that drive power or torque can be transmitted from the first electric motor to the second drive shaft, and drive power or torque can likewise be transmitted from the second electric motor to the first drive shaft. This in turn allows so-called downsizing of both the first electric motor and the second electric motor, since both can assist one another in terms of drive if a power demand exists at one of the two electric motors, which power demand cannot be provided, or can be provided only under unfavorable conditions, for example with low efficiency, by the electric motor respectively concerned. The downsizing consequently also allows a reduction in weight, in installation space and in the provision costs of both the first electric motor and the second electric motor.

Here, it is conceivable and preferred to provide not only a single first electric motor and a single second electric motor but also multiple first electric motors and multiple second electric motors, which may for example be coupled to one another in each case via a summing transmission.

According to a preferred embodiment of the invention, it is provided that the first coupling gearwheel is fixedly connected in terms of drive to the first drive shaft, that the second coupling gearwheel is configured as an idler gearwheel and is connectable in terms of drive to the second drive shaft by means of a coupling element, that a first clutch for interrupting a power flow in the first drive shaft is connected downstream of the first coupling gearwheel in terms of drive and that a second clutch for interrupting a power flow in the second drive shaft is connected downstream of the second coupling gearwheel in terms of drive.

This results in the advantage that a relatively simple and therefore inexpensive embodiment of the powertrain according to the invention is provided. In the state in which the second coupling gearwheel is connected in terms of drive to the second drive shaft, power or torque can be transmitted from the first drive shaft to the second drive shaft or vice versa. If the first clutch is opened and the second clutch is closed at the same time, that is to say if the drive flow in the first drive shaft is interrupted beyond the first clutch, the entire power or the entire torque of the first electric motor can be provided on the second drive shaft. If, conversely, the second clutch is opened and the first clutch is closed, that is to say if the drive flow in the second drive shaft is interrupted beyond the second clutch, the entire power or the entire torque of the second electric motor can be provided on the first drive shaft. It is likewise conceivable and preferred to completely close the first clutch and partially close the second clutch, such that the second clutch can transmit only a limited torque, or vice versa.

The first coupling gearwheel is advantageously configured as a fixed gearwheel.

The first clutch and the second clutch are preferably configured as multiplate clutches.

According to a further preferred embodiment of the invention, it is provided that a planetary gear set is arranged on the first drive shaft, wherein a first input of the planetary gear set is connected in terms of drive to the first coupling gearwheel and wherein a second input of the planetary gear set is connected in terms of drive to the first drive shaft. This results in the advantage that a transmission of power or torque from the first drive shaft to the second drive shaft or vice versa is made possible, while at the same time the construction of the powertrain remains relatively simple and inexpensive.

The phrase "that a planetary gear set is arranged on the first drive shaft" is to be understood in the context of the invention to mean that the planetary gear set increases or reduces a torque introduced into the first drive shaft by the first electric motor and possibly by the second electric motor and then transmits said torque to an output shaft of the planetary gear set, which constitutes an axial elongation of the first drive shaft.

According to a particularly preferred embodiment of the invention, it is provided that the first input is configured as a planet carrier, wherein the planet carrier is connected rotationally conjointly to the first coupling gearwheel, and that the second input is configured as a sun gearwheel, wherein the sun gearwheel is connected rotationally conjointly to the first drive shaft. This thus means that a rotational speed of the first drive shaft corresponds identically to a rotational speed of the sun gearwheel and that a rotational speed of the first coupling gearwheel corresponds identically to a rotational speed of the planet carrier. In this case, the first coupling gearwheel is preferably an idler gearwheel. This results in the advantage that the first drive shaft and the second drive shaft are connected to one another in terms of drive via the planetary gear set and, at the same time, torques and rotational speeds are increased or reduced by means of the planetary gear set, such that the first drive shaft can be provided for a first purpose while the second drive shaft can be provided for a second purpose.

According to a further particularly preferred embodiment of the invention, it is provided that the second coupling gearwheel is configured as an idler gearwheel, wherein the second coupling gearwheel is blockable by means of a blocking device and is connectable in terms of drive to the second drive shaft by means of a coupling element. This results in the advantage that a power split from the first drive shaft to the second drive shaft and vice versa is likewise made possible, in particular in conjunction with the planetary gear set. For this purpose, the coupling element is closed and the blocking device is opened. In this shift state, the second coupling gearwheel is connected rotationally conjointly to the second drive shaft, such that there is a drive connection between the first drive shaft and the second drive shaft. If, on the other hand, the blocking device is closed and the coupling element is opened, then the first drive shaft is driven exclusively by the first electric motor and the second drive shaft is driven exclusively by the second electric motor.

The blocking device is preferably configured as a brake, for example as a multiplate brake.

The coupling element is preferably configured as a clutch, for example as a multiplate clutch or as a dog clutch.

According to a further particularly preferred embodiment of the invention, it is provided that a third electric motor is connected in terms of drive to an output of the planetary gear set. This results in the advantage that further downsizing of both the first electric motor and the second electric motor, but in particular of the first electric motor, is made possible. This further downsizing allows a further reduction in weight and installation space for both the first electric motor and the second electric motor, but in particular for the first electric motor. The third electric motor may for example transmit additional power or additional torque to the output of the planetary gear set whenever the power or the torque of the first electric motor and/or of the second electric motor, but in particular exclusively of the first electric motor, does not meet an existing demand for power or torque or the existing demand for power or torque could be provided by the first electric motor and/or by the second electric motor, but in particular exclusively by the first electric motor, only at an inefficient operating point.

According to a further preferred embodiment of the invention, it is provided that the first electric motor is assigned to a traction drive and the second electric motor is assigned to an auxiliary drive. These assignments of the first electric motor and of the second electric motor have proven to be highly suitable.

According to a particularly preferred embodiment of the invention, it is provided that the auxiliary drive comprises a mechanical power take-off drive and a hydraulic pump drive. The auxiliary drive can thus be used in a variety of ways and allows the operation of a wide variety of mounted implements, which can be driven equally mechanically or hydraulically.

According to a particularly preferred embodiment of the invention, it is provided that the auxiliary drive comprises a powershift-capable auxiliary drive transmission. This leads to increased flexibility of the auxiliary drive and thus of the powertrain according to the invention.

According to a further particularly preferred embodiment of the invention, it is provided that the traction drive comprises a powershift-capable traction drive transmission. This leads to correspondingly increased flexibility also of the traction drive and thus likewise to increased flexibility of the powertrain according to the invention.

According to a further preferred embodiment of the invention, it is provided that the first electric motor and the second electric motor are arranged in a common housing. This allows a space-saving and weight-saving arrangement of the first electric motor and of the second electric motor within the powertrain. Furthermore, the common housing saves weight and costs in relation to two individual housings. The first and the second electric motor may for example be constructed axially one behind the other in a common housing, wherein the motor shafts may for example point out of the housing in opposite axial directions. However, an arrangement axially adjacent to one another in a correspondingly designed housing is equally also possible and preferred, such that both motor shafts may for example point in the same axial direction. There are also resulting advantages with regard to the outlay involved in damping vibrations, because it is not necessary for two individual housings to be respectively separately suspended in vibration-damped fashion.

If necessary, the third electric motor may also be arranged in the common housing.

Furthermore, it is preferably provided that the common housing comprises a common cooling and/or lubricating circuit for the first electric motor and the second electric motor. In relation to the provision of two separate cooling or lubricating circuits in each case for the first electric motor and the second electric motor, this leads to a yet further reduction in the installation space requirement and in particular in the production costs, because use can for example be made of a common delivery pump, a common cooler and a common oil filter. For example, the common housing may also comprise a common oil sump.

Oil can for example be used equally as a coolant and lubricant, wherein the cooling may be realized in particular by way of oil mist. If the cooling circuit and the lubricating circuit are configured independently of one another, it is for example also possible for water to be used instead of oil for the cooling circuit. In the latter case, it is preferred that the oil circuit and the lubricating circuit are duly provided independently of one another but are each provided jointly for the first electric motor and the second electric motor, that is to say a common, for example oil-based, lubricating circuit is provided for the first electric motor and the second electric motor and a common, for example water-based, cooling circuit that is independent of the lubricating circuit is likewise provided for the first electric motor and the second electric motor.

Furthermore, it is preferred that, for each electric motor, that is to say for the first, the second and, if applicable, the third electric motor, respectively separate power electronics are provided for the open-loop and/or closed-loop control of the respective electric motor. If more than just a first, a second or, if applicable, a third electric motor are provided, it is also possible for all of the first, second and third electric motors to each have common power electronics, wherein the power electronics are in this case composed of two or, if applicable, three individual electronic components, which may be arranged in a common housing and may for example have a common energy supply and a common cooling arrangement.

According to a further preferred embodiment of the invention, it is provided that the first electric motor and the second electric motor are of identical construction. This thus means that the first electric motor and the second electric motor are of identical configuration and are interchangeable with one another. This identical construction has the advantage that, only a single electric motor has to be developed rather than two different electric motors. Likewise, only machine tools and manufacturing devices for one embodiment of electric motor need to be acquired. Since both the development costs and the acquisition costs for machine tools and manufacturing devices are usually factored into the sales price of the electric motors, this results in a cost advantage, by way of the so-called unit quantity effect, in relation to the use of two different electric motors as the first electric motor and the second electric motor.

It is preferably provided that the third electric motor is also of identical construction to the first electric motor and the second electric motor.

The optionally provided auxiliary drive transmission and the optionally provided traction drive transmission are preferably also of identical construction. This results in the already described unit quantity effect with regard also to the auxiliary drive transmission and the traction drive transmission.

According to a further preferred embodiment of the invention, it is provided that the powertrain furthermore comprises an electrical energy store and is configured to operate the first electric motor and the second electric motor and/or the third electric motor in a generator mode in order to charge the energy store. It is thus specifically advantageously possible for kinetic energy to be recuperated both by the first electric motor and by the second electric motor and/or by the third electric motor and fed to the electrical energy store. In the recuperation mode, the first electric motor and/or the second electric motor and/or the third electric motor work as generators and convert mechanical, namely kinetic, energy into electrical energy. This electrical energy can later be withdrawn again from the electrical energy store if necessary in order to be supplied to the first electric motor and/or the second electric motor and/or the third electric motor. In addition, it may also be provided that the electrical energy store can be charged with external electrical energy via a charging cable or some other suitable charging device, for example an induction charging device. The use of the first electric motor and/or of the second electric motor and/or of the third electric motor for recuperation also reduces the wear of a mechanical friction brake.

The invention furthermore relates to a work machine comprising a powertrain according to the invention. This also yields the advantages already described in conjunction with the powertrain according to the invention for the work machine according to the invention.

It is preferably provided that the work machine is configured as an agricultural work machine.

The invention will be discussed by way of example below on the basis of embodiments illustrated in the figures.

BRIEF DESCRIPTION OF THE DRAWINGS

In the drawing:

FIG. 1 shows, by way of example and schematically, a possible embodiment of a powertrain according to the invention for a work machine, FIG. 2 shows, by way of example and schematically, a further possible embodiment of a powertrain according to the invention for a work machine, FIG. 3 shows, by way of example and schematically, a further possible embodiment of a powertrain according to the invention for a work machine, and FIG. 4 shows, by way of example and schematically, a further possible embodiment of a powertrain according to the invention for a work machine.

DETAILED DESCRIPTION

Identical objects, functional units and similar components are denoted by the same reference designations throughout the figures. These objects, functional units and similar components are of identical design in terms of their technical features unless explicitly or implicitly stated otherwise in the description.

FIG. 1 shows, by way of example and schematically, a possible embodiment of a powertrain 1 according to the invention for a work machine (not illustrated in FIG. 1). The powertrain 1 comprises a first electric motor 2, with a first drive shaft 3 that can be driven by the first electric motor 2, and a second electric motor 4, with a second drive shaft 5 that can be driven by the second electric motor 4. A first coupling gearwheel 6 is arranged on the first drive shaft 3 and a second coupling gearwheel 7 is arranged on the second drive shaft 5, wherein the first coupling gearwheel 6 engages with the second coupling gearwheel 7. The first coupling gearwheel 6 and the second coupling gearwheel 7 allow coupling in terms of drive between the first drive shaft 3 and the second drive shaft 5. As can also be seen in FIG. 1, the first coupling gearwheel 6 is connected rotationally conjointly to the first drive shaft 3, whereas the second coupling gearwheel 7 is configured as an idler gearwheel and is connectable in terms of drive to the second drive shaft 5 by means of a coupling element 8. The coupling element 8 is configured here in the example as a multiplate brake. In the closed state of the coupling element 8, the second coupling gearwheel 7 is coupled rotationally conjointly to the second drive shaft 5, such that, in this state, there is correspondingly coupling in terms of drive between the first drive shaft 3 and the second drive shaft 5. By contrast, in the open state of the coupling element 8, the second coupling gearwheel 7 is not coupled to the second drive shaft 5, such that, in this state, there is no coupling in terms of drive between the first drive shaft 3 and the second drive shaft 5. Furthermore, a first clutch 9 for interrupting a power flow in the first drive shaft 3 is connected downstream of the first coupling gearwheel 6 in terms of drive and a second clutch 10 for interrupting a power flow in the second drive shaft 5 is connected downstream of the second coupling gearwheel 7 in terms of drive.

If the first clutch 9 is opened and the second clutch 10 is closed, that is to say if the drive flow in the first drive shaft 3 is interrupted beyond the first clutch 9, the entire power or the entire torque of the first electric motor 2 can be provided on the second drive shaft 5 via the first coupling gearwheel 6 and the second coupling gearwheel 7 if the coupling element 8 is additionally closed. If, conversely, the second clutch 10 is opened and the first clutch 9 is closed, that is to say if the drive flow in the second drive shaft 5 is interrupted beyond the second clutch 10, the entire power or the entire torque of the second electric motor 4 can be provided on the first drive shaft 3 if the coupling element 8 is additionally closed. If both the first clutch 9 and the second clutch 10 are closed and the coupling element 8 is additionally open, then the first electric motor 2 drives only the first drive shaft 3 and the second electric motor 4 drives only the second drive shaft 5. In the example, the first electric motor 2 drives a traction drive of the work machine via the first drive shaft 3 and the second electric motor 4 drives an auxiliary drive of the work machine via the second drive shaft 5.

FIG. 2 shows, by way of example and schematically, a further possible embodiment of a powertrain 1 according to the invention for a work machine (not illustrated in FIG. 2). The powertrain 1 comprises a first electric motor 2, with a first drive shaft 3 that can be driven by the first electric motor 2, and a second electric motor 4, with a second drive shaft 5 that can be driven by the second electric motor 4. A first coupling gearwheel 6 is arranged on the first drive shaft 3 and a second coupling gearwheel 7 is arranged on the second drive shaft 5, wherein the first coupling gearwheel 6 engages with the second coupling gearwheel 7. The first coupling gearwheel 6 and the second coupling gearwheel 7 allow coupling in terms of drive between the first drive shaft 3 and the second drive shaft 5. As can also be seen in FIG. 2, the second coupling gearwheel 7 is configured as an idler gearwheel and is connectable in terms of drive to the second drive shaft 5 by means of a coupling element 8. The coupling element 8 is configured here in the example as a multiplate brake. In the closed state of the coupling element 8, the second coupling gearwheel 7 is coupled rotationally conjointly to the second drive shaft 5, such that, in this state, there is correspondingly coupling in terms of drive between the first drive shaft 3 and the second drive shaft 5. By contrast, in the open state of the coupling element 8, the second coupling gearwheel 7 is not coupled to the second drive shaft 5, such that, in this state, there is no coupling in terms of drive between the first drive shaft 3 and the second drive shaft 5. In addition, the second coupling gearwheel 7 can be blocked by means of a blocking device 14. In the example, the blocking device is likewise configured as a multiplate brake. When the blocking device 14 is closed, the second coupling gearwheel 7 is held non-rotatably on a housing 15. In the open state of the blocking device 14, however, the second coupling gearwheel 7 can rotate relative to the housing 15. Furthermore, a planetary gear set 11 is arranged on the first drive shaft 3, wherein a first input of the planetary gear set 11 is connected in terms of drive to the first coupling gearwheel 3. In the example, the first input of the planetary gear set 11 is a planet carrier 12 of the planetary gear set 11. A second input of the planetary gear set 11 is connected in terms of drive to the first drive shaft 3, wherein, in the example, the second input of the planetary gear set 11 is a sun gearwheel 13.

Now, if the blocking element 14 is open and the coupling element 8 is closed, the power provided by the first electric motor 2 or the torque provided by the first electric motor 2 can be divided equally between the first drive shaft 3 and the second drive shaft 5. Likewise, the power provided by the second electric motor 4 or the torque provided by the second electric motor 4 can be divided equally between the first drive shaft 3 and the second drive shaft 5. Here, the rotational speed and correspondingly also the torque respectively input by the first electric motor 2 and by the second electric motor 4 are additionally increased by means of the planetary gear set 11. If, however, the blocking element 14 is closed and the coupling element 8 is open, then the first electric motor 2 drives only the first drive shaft 3 and the second electric motor 4 drives only the second drive shaft 5. In the example, the first electric motor 2 drives a traction drive of the work machine via the first drive shaft 3 and the second electric motor 4 drives an auxiliary drive of the work machine via the second drive shaft 5.

FIG. 3 shows, by way of example and schematically, a further possible embodiment of a powertrain 1 according to the invention for a work machine (not illustrated in FIG. 3). The powertrain 1 illustrated in FIG. 3 corresponds here to the powertrain 1 already described in FIG. 2, but also has a third electric motor 16 which, via a fixed gearwheel 17, is connected in terms of drive to an output 18 of the planetary gear set 11. Additional power or an additional torque can thus be provided on the first drive shaft 3 by means of the third electric motor 16.

FIG. 4 shows, by way of example and schematically, a further possible embodiment of a powertrain 1 according to the invention for a work machine (not illustrated in FIG. 4). The powertrain 1 illustrated in FIG. 4 corresponds here to the powertrain 1 already described in FIG. 2, but does not have the blocking element 14 and does not have the coupling element 8. In this way, the first electric motor 2 and the second electric motor 4 or the first drive shaft 3 and the second drive shaft 5 are permanently coupled to one another, such that power and torque are permanently transmitted from the first electric motor 2 not only to the first drive shaft 3 but also to the second drive shaft 5 and, conversely, power and torque are permanently transmitted from the second electric motor not only to the second drive shaft 5 but also to the first drive shaft 3.

REFERENCE DESIGNATIONS

1 Powertrain
2 First electric motor
3 First drive shaft
4 Second electric motor
5 Second drive shaft
6 First coupling gearwheel
7 Second coupling gearwheel
8 Coupling element
9 First clutch
10 Second clutch
11 Planetary gear set
12 Planet carrier
13 Sun gearwheel
14 Blocking device
15 Housing
16 Third electric motor
17 Fixed gearwheel
18 Output of the planetary gear set

The invention claimed is:

1. A powertrain for a work machine, the powertrain comprising:
a first electric motor;
a first drive shaft being concentrically aligned with and drivable by the first electric motor;
a second electric motor;
a second drive shaft being concentrically aligned with and drivable by the second electric motor;
a first coupling gearwheel fixedly connected to the first drive shaft;
a second coupling gearwheel configured as an idler gearwheel and connectable in terms of drive to the second drive shaft by means of a coupling element;
a first clutch configured for interrupting a power flow in the first drive shaft, the first clutch connected downstream of the first coupling gearwheel in terms of drive; and
a second clutch, for interrupting a power flow in the second drive shaft, connected downstream of the second coupling gearwheel in terms of drive;
wherein the first coupling gearwheel directly engages with the second coupling gearwheel.

2. The powertrain of claim 1, further comprising a planetary gear set arranged on the first drive shaft, the planetary gear set including a first input and a second input, wherein the first input of the planetary gear set is connected in terms of drive to the first coupling gearwheel and the second input of the planetary gear set is connected in terms of drive to the first drive shaft.

3. The powertrain of claim 2, wherein the first input is configured as a planet carrier, the planet carrier is connected rotationally conjointly to the first coupling gearwheel, and the second input is configured as a sun gearwheel, and the sun gearwheel connected rotationally conjointly to the first drive shaft.

4. The powertrain of claim 2, wherein the second coupling gearwheel is configured as an idler gearwheel, the second coupling gearwheel is blockable by a blocking device, and the second coupling gearwheel is connectable in terms of drive to the second drive shaft by a coupling element.

5. The powertrain of claim 2, further comprising a third electric motor connected in terms of drive to an output of the planetary gear set.

6. The powertrain of claim 2, wherein the first electric motor and the second electric motor are arranged in a common housing.

7. The powertrain of claim 1, wherein the first electric motor is assigned to a traction drive and the second electric motor is assigned to an auxiliary drive, and the first drive shaft is offset from but extends parallel to the second drive shaft.

8. The powertrain of claim 7, wherein the auxiliary drive comprises a powershift-capable auxiliary drive transmission.

9. The powertrain of claim 7, wherein the traction drive comprises a powershift-capable traction drive transmission.

10. The powertrain of claim 7, wherein the auxiliary drive further comprises a mechanical power take-off drive and a hydraulic pump drive.

11. The powertrain of claim 10, wherein the auxiliary drive comprises a powershift-capable auxiliary drive transmission.

12. The powertrain of claim 10, wherein the traction drive comprises a powershift-capable traction drive transmission.

13. A powertrain for a work machine, the powertrain comprising:
a first electric motor;
a first drive shaft being concentrically aligned with and drivable that can be driven by the first electric motor;
a second electric motor;
a second drive shaft being concentrically aligned with and drivable that can be driven by the second electric motor;
the first drive shaft and the second drive shaft being parallel to but being offset with respect to one another;
a first coupling gearwheel being arranged on the first drive shaft;
a second coupling gearwheel configured as an idler gearwheel and connectable in terms of drive to the second drive shaft by means of a coupling element;
a first clutch configured for interrupting a power flow in the first drive shaft, the first clutch connected downstream of the first coupling gearwheel in terms of drive; and
a second clutch, for interrupting a power flow in the second drive shaft, the second clutch connected downstream of the second coupling gearwheel in terms of drive;
wherein the first coupling gearwheel directly engages with the second coupling gearwheel and the first electric motor and the second electric motor are of identical construction.

14. The powertrain of claim 13, further comprising:
a planetary gear set arranged on the first drive shaft, the planetary gear set including a first input and a second input, wherein the first input of the planetary gear set is connected in terms of drive to the first coupling gearwheel, and the second input of the planetary gear set is connected in terms of drive to the first drive shaft.

15. The powertrain of claim 14, further comprising a third electric motor connected in terms of drive to an output of the planetary gear set.

16. The powertrain of claim 15, further comprising an electrical energy store configured to operate the first electric motor and the second electric motor and/or the third electric motor in a generator mode in order to charge the electrical energy store.

17. A work machine comprising the powertrain of claim 16.

18. A work machine comprising a powertrain for the work machine, the powertrain comprising:
- a first electric motor for driving a traction drive of the work machine;
- a first drive shaft being concentrically aligned with and drivable by the first electric motor;
- a second electric motor for driving an auxiliary drive of the work machine;
- a second drive shaft being concentrically aligned with and drivable by the second electric motor;
- a first coupling gearwheel being arranged on the first drive shaft;
- a second coupling gearwheel being arranged on the second drive shaft, the second coupling gearwheel configured as an idler gearwheel and connectable in terms of drive to the second drive shaft by means of a coupling element;
- a first clutch configured for interrupting a power flow in the first drive shaft, the first clutch connected downstream of the first coupling gearwheel in terms of drive; and
- a second clutch, for interrupting a power flow in the second drive shaft, connected downstream of the second coupling gearwheel in terms of drive;
- wherein the first and the second coupling gearwheels both lie in a common plane, and the first coupling gearwheel directly engages with the second coupling gearwheel so that, when desired, at least one of power and torque can be transmitted from the first drive shaft to the second drive shaft or vice versa.

19. The work machine of claim 18, wherein the work machine is configured as an agricultural work machine.

* * * * *